United States Patent [19]
Takeuchi et al.

[11] 4,009,640
[45] Mar. 1, 1977

[54] ANTI-LOCK BRAKE SYSTEM

[75] Inventors: Yasuhisa Takeuchi; Haruhiko Iizuka, both of Yokosuka, Japan

[73] Assignee: Nissan Motor Co., Ltd., Yokohama, Japan

[22] Filed: June 20, 1975

[21] Appl. No.: 588,629

Related U.S. Application Data

[62] Division of Ser. No. 446,829, Feb. 28, 1974, Pat. No. 3,910,645.

[30] Foreign Application Priority Data

Mar. 1, 1973 Japan .............................. 48-24693

[52] U.S. Cl. ...................................... 91/47; 91/434
[51] Int. Cl.² .................. F15B 13/042; F15B 13/14
[58] Field of Search ............... 91/373, 372, 47, 431, 91/434

[56] References Cited
UNITED STATES PATENTS

| | | | |
|---|---|---|---|
| 941,426 | 11/1909 | Loudon | 91/47 |
| 1,978,862 | 10/1934 | Gregg | 91/47 |
| 2,369,397 | 2/1945 | Kostenick | 91/47 |
| 2,408,685 | 10/1946 | Rosenberger | 91/47 |
| 3,159,974 | 12/1964 | Rodgers | 91/47 |

*Primary Examiner*—Paul E. Maslousky

[57] ABSTRACT

An anti-lock brake system includes a center hydraulically boosted master cylinder for hydraulically actuation of wheel master cylinder associated with a wheel brake, a center brake control valve assembly functioning to channel pump generated fluid pressure to a booster of a center master cylinder for actuation thereof and including an operator actuating assembly functioning to dampen the reaction force to an operator pedal during anti-lock control operation and permit booster actuation in the event of the loss of pump generated fluid pressure, an hydraulically actuated return piston for return actuation of the wheel master cylinder to relieve brake pressure to the wheel brake, and an anti-lock control valve functioning to cyclically apply and release fluid pressure to the hydraulically actuated return piston for actuation thereof during anti-lock control operation.

1 Claim, 5 Drawing Figures

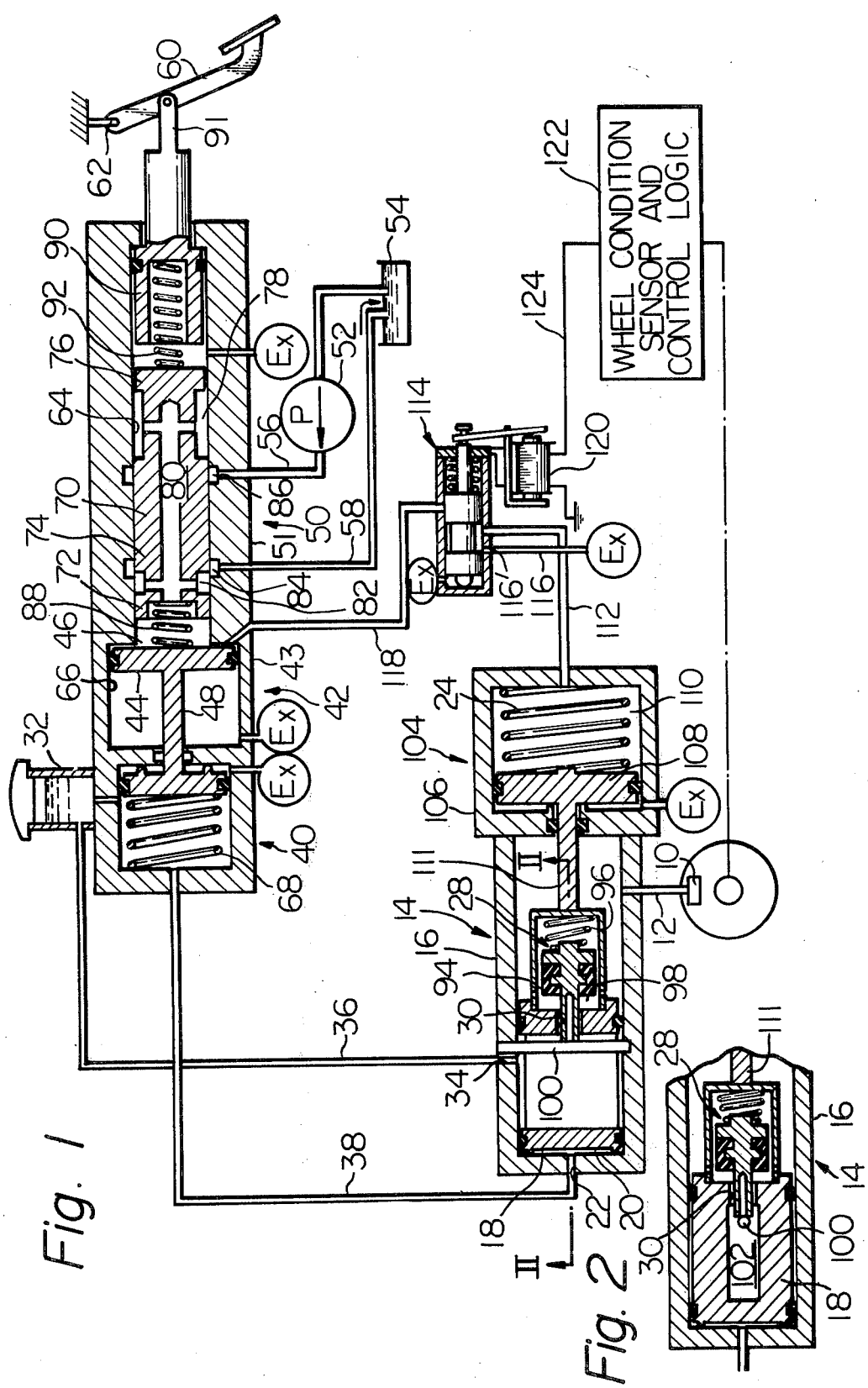

ANTI-LOCK BRAKE SYSTEM

This is a division of application Ser. No. 446,829, filed Feb. 28, 1974 now U.S. Pat. No. 3,910,645.

The present invention relates to an anti-lock brake system and more particularly to an anti-lock system having a fail safe hydraulic brake apply system.

The present invention relates to a brake system wherein a booster assisted center master cylinder and hydraulically actuated wheel master cylinder assembly are mounted in tandem for actuation of each wheel brake or set of wheel brakes to be controlled in unison. Pump generated hydraulic operating fluid is communicated to a booster piston for actuation of a master cylinder piston of the center master cylinder and through a center brake control valve to the pump reservoir. Operator actuation of brake control valve restricts fluid flow to the reservoir thus inducing a back pressure which actuates the booster piston to actuate the center master cylinder. The center master cylinder then actuates wheel master cylinder assembly and wheel brake fluidly connected therewith. In the brake system release of brake during anti-lock control of each wheel is accomplished by pushing back a wheel master cylinder piston associated therewith.

The present invention features an actuating assembly for the center brake control valve which dampens pulsating variations of a reaction force to an operator pedal during anti-lock operation of the brake system and which includes a fail-safe feature in that upon loss of pump-generated pressure it permits direct actuation of the booster piston by the operator pedal.

The present invention also features hydraulic actuator assembly associated with each wheel master cylinder to assist return movement of the associated wheel master cylinder piston control valve arrangement located intermediate the booster and each of the hydraulic actuators to cyclically apply and release pressure to each hydraulic actuator.

The other features, objects and advantages of the present invention will become apparent upon consideration of the following description and the accompanying drawings, in which:

FIG. 1 illustrates an anti-lock brake system embodying the present invention with parts broken away and in section;

FIG. 2 is a sectional view taken through line II—II in FIG. 1;

Figure 3:
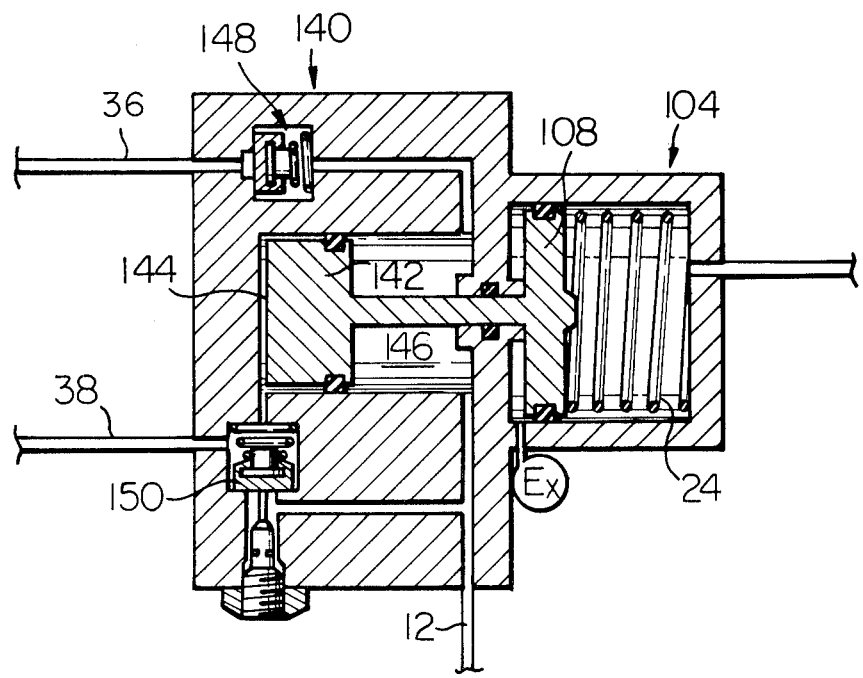
FIG. 3 is a sectional view of a modification of wheel master cylinder usable in brake system of FIG. 1.

Referring to the accompanying drawings and particularly to FIGS. 1 and 2, brake system will be generally described hereinafter.

The anti-lock brake system of the present invention is embodied in a motor vehicle having a fluid pressure actuated wheel brake 10, which may be any one of fluid pressure front wheel brakes and fluid pressure actuated rear wheel brakes. A conduit 12 connects wheel brake 10 with wheel master cylinder 14.

Wheel master cylinder 14 includes a housing 16 having a piston 18 sealingly slidable therein and cooperating therewith to form expansible chamber 20 which communicates with fluid inlet port 22 formed in the housing 16. A return spring 24 defines the rest position of power piston 18. Introduction of pressurized fluid into expansible chamber 20 displaces piston 18 rightwardly, allowing one-way check valve 28 to close passage 30 communicating with fluid brake reservoir 32 through port 34 and a conduit 36 and providing brake pressure to wheel brake 10.

A conduit 38 connects wheel master cylinder 14 to a conventional center master cylinder 40. Booster assembly 42 is associated with the master cylinder 40.

Booster assembly 42 includes a housing 43 having a booster piston 44 sealingly slidable therein to form an expansible chamber 46. Introduction of pressurized fluid into expansible chamber 46 displaces booster piston 44 leftwardly actuating the master cylinder 40 through rod 48 extending therebetween.

A center brake control valve, indicated generally at 50, is actuable by the vehicle operator to provide pump generated fluid pressure for actuation of the booster piston 44. A fluid pump 52 delivers operating fluid from a pump reservoir 54 through conduit 56 to the center control valve 50. The center control valve 50 provides unrestricted fluid communication between expansible chamber 46 and the pump reservoir 54 through exhaust conduit 58. Brake actuation is initiated by movement of brake pedal 60 which is pivoted to the vehicle body at 62. Pedal actuation permits flow of pump generated fluid into expansible chamber 46 and closes or restricts the flow of pump generated fluid to pump reservoir 54 giving rise to a back pressure to the booster piston 44. A relaxation of the pedal actuating effort permits dissipation of the back pressure through exhaust conduit 58, thereby releasing the booster piston 44, center master cylinder 40, wheel master cylinder 14 and the wheel brake 10.

The brake control valve will be more specifically described hereinafter.

The brake control valve 50 includes housing 51 in which successively stepped bores 64 and 66 are formed. Booster piston 44 is sealingly slidable in bore 66 and return spring 68 of the master cylinder 40 defines the rest position of booster piston 44.

A spool 70 includes a first land 72, a second land 74 and a third land 76 which are of the same diameter and sealingly slidable in bore 64 of housing 51. An annular chamber 78 between recessed portion intermediate between lands 74 and 76 and housing 51 is communicated through a fluid passage 80 formed in spool 70 to the expansible chamber 46 and to annular chamber 82. The annular chamber 82 is communicated through outlet port 84 and conduit 58 to pump reseroir 54. Provided axially spaced apart from outlet port 84 is an inlet port 86 for operating fluid from fluid pump 52. A spring 88 disposed between booster piston 44 and land 72 of spool 70 defines the rest position of spool 70.

A valve actuating linkage includes reaction piston 90 which is sealingly slidable in bore 64 upon axial movement of pedal push rod 91 which connects the reaction piston 90 with the brake pedal 60. A spring 92 is disposed between land 76 and the reaction piston 90, and defines the rest position of the reaction piston 90.

In operation, with the elements of brake control valve 50 in their respective rest positions, as shown in FIG. 1 of the drawings, fluid flow generated by pump 52 is blocked by land 74 and expansible chamber 46 of booster assembly 42 is communicated to reservoir 54, whereby fluid pressure in the expansible chamber 46 is ubstantially zero. Thus center master cylinder 40 and wheel master cylinder 14 are in brake release positions.

Upon actuation of pedal 60, reaction piston 90 moves into housing 51 and spring 92 carries spool 70 leftwardly overcoming the action of spring 88 into a position wherein land 74 uncovers inlet port 86 and covers outlet port 84 to permit restricted flow to reservoir 54. The resulting pressure increase in expansible chamber 46 displaces booster piston 44, actuating wheel brake 10. The pressure in expansible chamber 46 acts upon land 72 of spool 70 to provide a reaction force on pedal 60 in proportion to the attained level of brake actuation.

During brake actuation at a normal rate, land 74 remains poised from outlet port 84 so that at least some flow is permitted through the outlet port to pump reservoir 54. The maximum pressure which may be generated in expansible chamber 46 is determined by the maximum load capacity of spring 92.

In the event of complete dissipation of pressure in expansible chamber 46 subsequent to a loss of pump generated fluid flow, pedal force is transmitted to booster piston 44 through reaction piston 90 spool 70 because reaction piston 90, spool 70 and booster piston 40 engage with one after another against the bias of springs 92 and 88.

The one-way check valve 28 is provided to permit rapid dissipation of brake pressure to wheel brake 10 upon rapid relaxation of pedal actuating effort. During rapid leftward movement by spring 24 of piston 18 valve member 94 is moved against the bias of spring 96 to open passage 30 thereby reducing brake pressure to wheel brake 10. When subsequently piston 18 returns to the rest position, valve stem 98 becomes in abutting engagement with stopper 100 extending through rectangular chamber 102 formed in piston 18 thereby providing complete dissipation of brake pressure to reservoir 32 pressure. Valve member 94 will be urged by vacuum to disengage from passage 30 if pressure to wheel brake lowers below reservoir 32 pressure thereby maintaining pressure to wheel brake 10 above or below reservoir 32 pressure.

A return piston assembly, generally designated at 104, includes housing 106 in which a piston 108 is sealingly slidable therewith to form a chamber 110. Return spring 24 is disposed in chamber 110 to bias wheel master cylinder piston 18 through intermediate rod 111 and one-way check valve assembly 28 to define the rest position of wheel master cylinder piston 18. Piston 108 is larger in diameter than booster piston 44.

Anti-lock control valve circuit which is located intermediate the center brake control valve 50 and the return piston assembly 104 functions to cylically apply and release pressure to chamber 110. The chamber 110 is communicated through a conduit 112 through a switch valve 114 to exhaust conduit 116 unrestrictedly. A conduit 118 leads from expansible chamber 46 to switch valve 114 where it is blocked. The switch valve 114 which normally permit unrestricted fluid communication between conduit 112 and 116 and block conduit 118 has an actuating solenoid 120.

Energization of the solenoid 120 of the anti-lock valve 14 is by a wheel condition sensor and control logic 122. Such a wheel condition sensor and control logic should be so designed as to provide a solenoid energizing current on line 124 when pre-skid condition or skid condition is detected.

If the level of back pressure to the wheel cylinder 14 is excessive, an incipient wheel lock condition is created. If, for example, the wheel condition sensor and control logic 122 senses an impending lockup of wheel braked by wheel brake 10, solenoid coil 120 will be energized. Energization of solenoid coil 120 closes port 116' communicated to conduit 116 and connects conduit 118 to conduit 112 thereby permitting pressure of operating fluid in expansible chamber 46 to be transmitted to chamber 110. Introduction of pressurized fluid to chamber 110 will displace through piston 108 wheel master cylinder piston 18 toward the rest position thereby reducing brake pressure to wheel brake 10. It will be noted that this piston 18 movement of wheel master cylinder 14 will cause booster piston 44 to move toward the rest position thereof and spool 70 toward reaction piston 90 since the diameter of piston 108 is relatively larger than that of servo piston 44. This resultant movement of spool 70 is effectively dampened by spring 92, lessening the force to brake pedal 60. It will be noted that upon establishment of fluid connection to chamber 110 pressure to expansible chamber 46 drops, permitting land 74 to block flow of operating fluid to reservoir 54 with the result that the drop of pressure is compensated.

When the wheel speed has recovered to a suitable level, the wheel condition sensor and control logic 122 deenergizes solenoid coil 120 permitting anti-lock control valve 114 to return to its normal position. The pressure in chamber 110 is then exhausted and returns to substantially zero. The pressure to wheel brake 10 again increases. The wheel condition sensor and control logic 122 may cyclically energize and deenergize solenoid coil 120 to cyclically release and apply the wheel brake 10 until the excessive pedal actuable force is relieved or the vehicle is brought to a stop.

FIG. 3 illustrates a modified wheel master cylinder 140 which may be located fluidly intermediate center master cylinder 40 and wheel brake 10 (see also FIG. 1). Since return piston assembly is analogous to that of FIG. 1 the corresponding elements thereof are assigned corresponding numerals. Wheel master cylinder 140 includes a piston 142 sealingly slidable to form an expansible chamber 144 which is fluidly connected to center master cyliner 40 (see FIG. 1) by conduit 38. Conduit 36 leads from reservoir 36 to a contractable chamber 146 through a normally closed one-way flow check valve 148. Another normally closed one-way flow check valve 150 is provided fluidly intermediate between conduit 38 and conduit 12. Introduction of pressurized fluid into expansible chamber 144 displaces piston 142, actuating wheel brake 10 (see FIG. 1).

Should pressure in contractable chamber 146 fail to drop to the level of back pressure in expansible chamber 144 upon relaxation of brake actuating effort, normally closed valve 150 is opened to permit flow of fluid to conduit 38 thus always assuring the release of the brake.

Should pressure of fluid in contractable chamber 146 drop below reservoir 32 pressure (see FIG. 1), normally closed valve 148 is opened to permit flow of reservoir fluid to contractable chamber 146. Thus creation of vacuum in contractable chamber is prevented.

Figure 4:
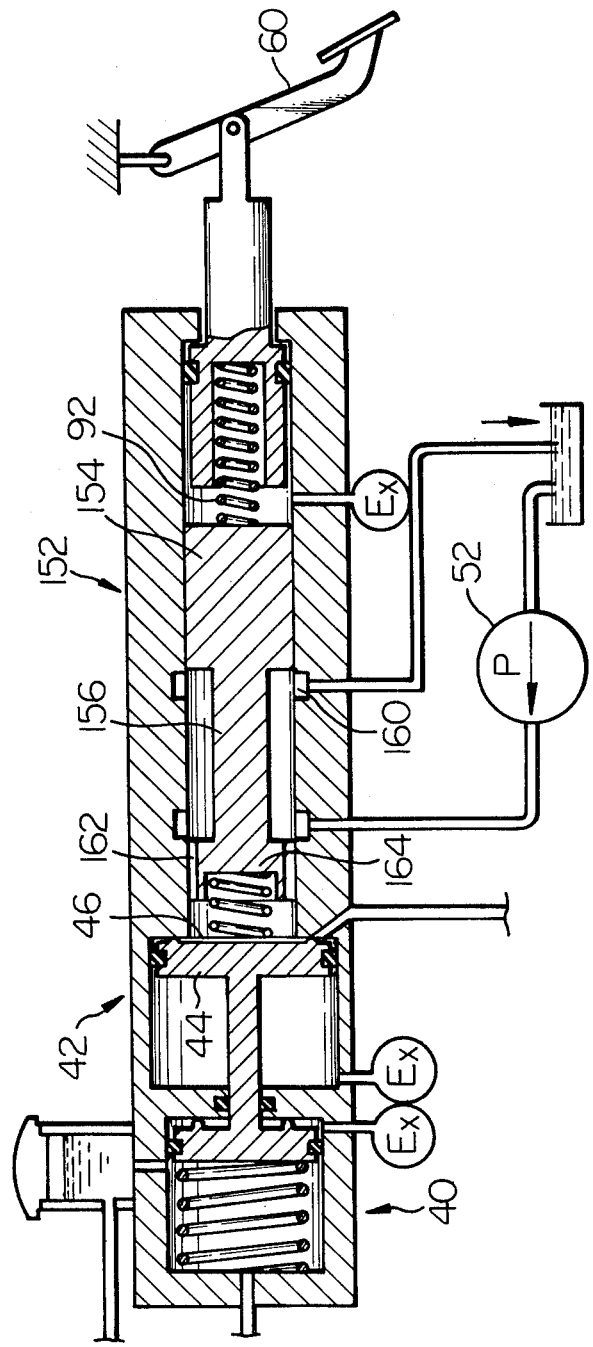
FIG. 4 is a sectional view of a modification of center brake control valve usable in brake system of FIG. 1.

FIG. 4 illustrates a modified form of center brake control valve 152 which is different from center brake control valve 50 (see FIG. 1) in that land 154 of spool 146 uncovers inlet port 158 and outlet port 160 when spool 156 in its rest position. In operation with the elements of brake control valve 152 in their respective positions, as shown in FIG. 4 of the drawings, fluid flow generated by pump 52 is communicated unrestrictedly to pump reservoir 54 and substantially zero pressure through passage 162 formed through land 164 to expansible chamber 46 of booster assembly 42. Upon actuation of pedal 60, spring 92 transmits pedal force to spool 156 and land 154 restricts flow to reservoir 54, accordingly. The resulting pressure increase in expansible chamber 46 displaces booster piston 44, thereby actuating center master cylinder 40.

Figure 5:
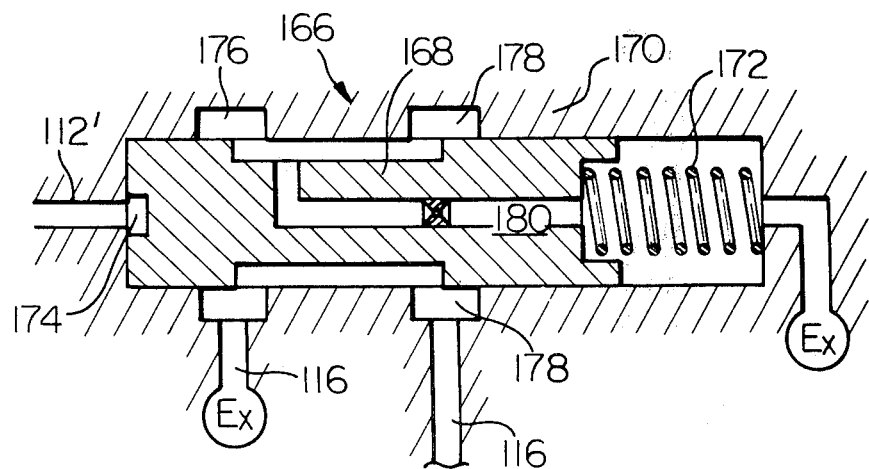
FIG. 5 is a sectional diagrammatic view of flow restricting valve usable in brake system of FIG. 1.

A flow restricting valve 166, as illustrated in FIG. 5, may be located in conduit 116 (see FIG. 1) intermediate anti-lock valve 114 and pump reservoir to permit pressurized fluid in chamber 110 to be exhausted in a restricted flow rate upon deenergization of solenoid coil 120 (see FIG. 1) during anti-lock control operation of brake system, thereby gradually increasing brake pressure to wheel brake 10. The flow restricting valve 166 includes a spool 168 slidable in housing 170 and a spring 172 which defines the rest position of spool 168. A conduit 112' branched off from 112 (see FIG. 1) is communicated to port 174. Introduction of pressurized fluid to port 174 displaces spool 172 rightwardly to cover exhaust port 176, permitting inlet port 178 through flow restriction passage 180 formed in spool 172 to exhaust.

It will be understood that during normal operation of brake system of FIG. 1, unrestricted exhaust conduit 116 is provided through valve 166 illustrated in FIG. 5, since spool 168 is in the rest position.

Energization of solenoid coil 120 (see FIG. 1), during anti-lock control operation, creates fluid pressure in conduit 112 and conduit 112', displacing spool 168 rightwardly to fluidly connect flow restriction exhaust passage 180 to conduit 116 through port 178. Upon deenergization of solenoid coil 120 subsequently to the energization thereof fluid in chamber 110 (see FIG. 1) is restrictedly exhausted, thereby permitting gradual reapplication of brake pressure to wheel brake 10. It will be appreciated therefore that with the flow restricting valve 166 in brake system illustrated in FIG. 1 smoother braking feel is obtained even during anti-skid operation.

What is claimed is:

1. In a motor vehicle having a pump means and a reservoir the combination comprising:
   a housing forming a power chamber and having an inlet port communicating operating fluid from the pump, and an outlet port in communication with the reservoir;
   a piston in said power chamber;
   a spool having a passage therein communicating with the power chamber and having axially spaced lands slidingly engaging the housing, the lands and the ports being so constructed and arranged as to provide unrestricted communication between the passage and the outlet port when the spool is in a rest or starting position, whereby the pressure in the power chamber is substantially zero;
   means including a continuous pressure of operating fluid in the power chamber and a biasing spring between the piston and spool for biasing the spool to the rest position thereof;
   operator actuable means adapted to progressively move the spool relative to the housing to restrict fluid communication of the passage with the reservoir thereby increasing the operating fluid pressure to the power chamber;
   spring means disposed between the spool and the operator actuable means for damping force applied to the operator actuable means by the spool.

* * * * *